United States Patent
Sundqvist et al.

(10) Patent No.: US 7,246,057 B1
(45) Date of Patent: Jul. 17, 2007

(54) SYSTEM FOR HANDLING VARIATIONS IN THE RECEPTION OF A SPEECH SIGNAL CONSISTING OF PACKETS

(75) Inventors: Jim Sundqvist, Luleå (SE); Håkan Lennestål, Luleå (SE); Anders Nohlgren, Luleå (SE); Morgan Lindqvist, Sundbyberg (SE); Wei Wang, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 693 days.

(21) Appl. No.: 10/296,859

(22) PCT Filed: May 31, 2000

(86) PCT No.: PCT/SE01/01140

§ 371 (c)(1),
(2), (4) Date: Oct. 6, 2003

(87) PCT Pub. No.: WO01/93516

PCT Pub. Date: Dec. 6, 2001

(30) Foreign Application Priority Data

May 31, 2000 (SE) .................................. 002016

(51) Int. Cl.
*G10L 19/12* (2006.01)
(52) U.S. Cl. ................................ 704/219; 704/503
(58) Field of Classification Search ............... 704/219, 704/503
See application file for complete search history.

(56) References Cited

U.S. PATENT DOCUMENTS

| 6,377,931 | B1 * | 4/2002  | Shlomot ................ 704/503 |
| 6,466,550 | B1 * | 10/2002 | Foster et al. ............ 370/261 |
| 6,975,629 | B2 * | 12/2005 | Welin ................... 370/392 |
| 7,003,097 | B2 * | 2/2006  | Marchok et al. ....... 379/406.01 |
| 7,027,989 | B1 * | 4/2006  | Tapadar et al. ........ 704/270 |
| 7,124,349 | B2 * | 10/2006 | Barrett et al. .......... 714/776 |

FOREIGN PATENT DOCUMENTS

| WO | WO 9522233 A1  | 8/1995  |
| WO | WO 9615598 A1  | 5/1996  |
| WO | WO 01/93516 A1 | 12/2001 |

\* cited by examiner

*Primary Examiner*—Susan McFadden

(57) ABSTRACT

The present invention relates to a receiver system in a communication system supporting packet-based communication (e.g., an IP-network), including a receiver, speech decoder and a jitter buffer for handling delay variations in the reception of a speech signal consisting of packets containing frames with encoded speech. A jitter buffer controller is provided for keeping information about the functional size of the jitter buffer and for providing the speech decoder with control information, such that the speech decoder, based on that information, provides a dynamic adaptation of the size of the jitter buffer using the received encoded, packetized speech signal. The invention also relates to a method of adapting the function size of the jitter buffer of a receiver system.

21 Claims, 7 Drawing Sheets

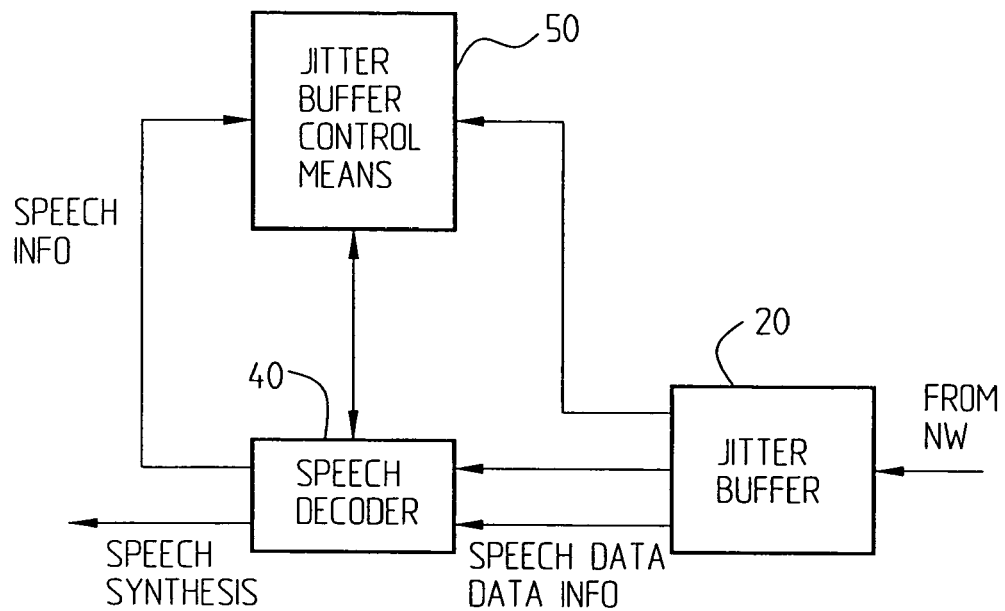
Fig. 6
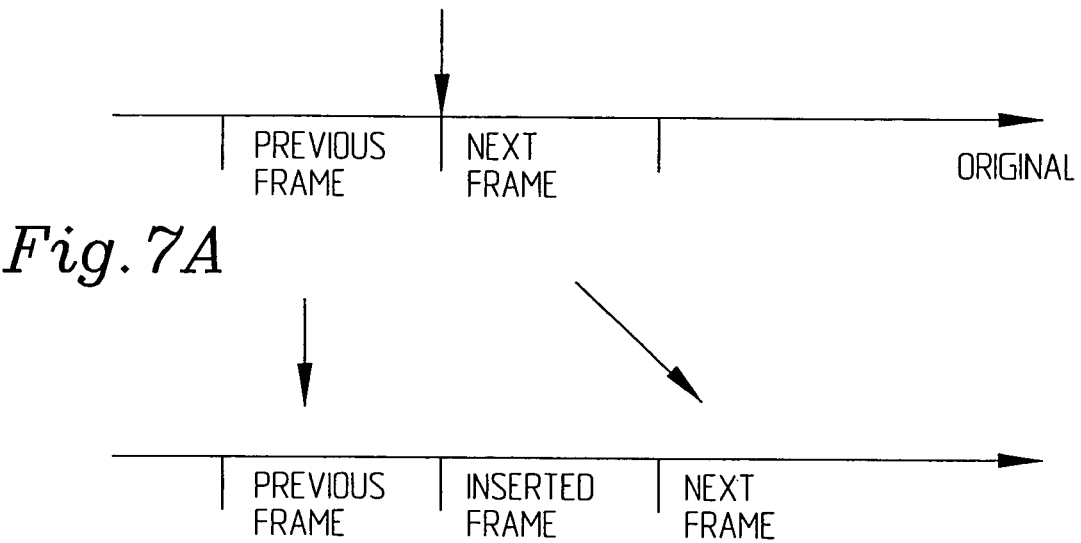
Fig. 7A
Fig. 7B

SYSTEM FOR HANDLING VARIATIONS IN THE RECEPTION OF A SPEECH SIGNAL CONSISTING OF PACKETS

PRIORITY CLAIM

This patent application claims priority to PCT patent application number PCT/SE01/01140 filed May 31, 2000.

FIELD OF THE INVENTION

The present invention relates, generally, to a receiver system in a communication system supporting packet-based communication of speech and data (e.g., an IP-network). More specifically, the present invention relates to a system comprising a receiver, a speech decoder and a jitter buffer for handling variations in the reception of a speech signal consisting of packets containing frames with encoded speech.

BACKGROUND OF THE INVENTION

One area undergoing fast development within telecommunications is voice over IP (VOIP) (e.g., Transmission Control Protocol/Internet Protocol—TCP/IP). Developments in this area initially focused on making phone calls at very low costs. Now, developments within this telecommunications area seem promising for new and different business applications. Because both speech and data use the same network and the same transmission protocol, it should be much easier to implement different information applications (e.g., call center, call screen, unified messages, etc.) with VOIP than with traditional telecommunication technologies. However, VOIP applications typically group voice or speech data to form packets, which are sent over shared common networks. Due to the nature of such networks, specific technical problems like the loss of packets, delay of packets, and jitter often occur.

Jitter can be described as the variation in arrival of consecutive packets. Typically, in real-time services such as in voice transmission, a packet encoded with speech is sent every 20 ms, which corresponds to 160 samples when using a sampling frequency of 8 kHz. Since delays vary throughout a network, different packets are delayed differently. Moreover, clocks of transmitting and receiving terminal units are not synchronized to one another. In order to smooth out delay variations, a receiving system or the receiving module of a terminal (i.e., a terminal that generally functions both as a receiver and a transmitter) is usually provided with a jitter buffer.

The relative size of the jitter buffer bears an important relation to resulting speech quality. If the size of the jitter buffer is too large, the one-way delay from mouth to ear will be too large, and the perceived quality will be degraded. For example, ITU-T Recommendations state that the one-way delay should be less than 150 ms for a regular telephony service.

If the jitter buffer is too small, however, packets delayed more than the size of the jitter buffer will arrive too late for any speech synthesis, and will be seen as lost. Therefore, an adaptive jitter buffer is needed to balance the size of the jitter buffer (i.e., delay at the receiving side) against packet loss.

Delay may also vary with time. In order to handle such variations, the size of the jitter buffer (i.e., the number of samples that the speech parameters within it would represent) needs to be adaptable. The jitter buffer can be measured and adapted in different ways. One conventional method measures jitter buffers through checking maximum variations in arrival times for the received packets. There are also various methods for performing the actual jitter buffer adaptation. For example, one conventional method performs a jitter buffer adaptation by using the beginning of a talk-spurt to reset the jitter buffer to a specified level. The distance, in number of samples, between two consecutive talk-spurts is increased at the receiving side if the jitter buffer is too small (e.g., during silence). Likewise, the number of samples is decreased if the jitter buffer is too large. Through this action the size of the jitter buffer is adaptable. In IP telephony solutions using, for example, the RTP protocol (Real Time Protocol), the marker flag in the RTP header identifies the beginning of a talk-spurt. Accordingly, the size of the jitter buffer can be changed when such a packet arrives at the receiving side.

However, the above-mentioned conventional solution statically resets the jitter buffer to a certain level at the beginning of each talk-spurt. It does not, for example, cover the case when network conditions change or if a wrong decision has been taken. Furthermore, if the jitter buffer size becomes too small, packets will be lost. Similarly, if the jitter buffer becomes too large, an unnecessary delay is introduced. In both cases, the perceived speech quality will be affected. This is undesirable. Moreover, because the jitter buffer is adapted only when there is a speech silence period, the problems will be even more severe during periods of long speech where no jitter buffer adaptations occur.

SUMMARY OF THE INVENTION

Therefore, a receiver, or a receiving module or function within a terminal unit, hereinafter commonly referred to as a receiver system, in a communication system is needed providing efficient handling of the variation in arrival time (i.e., packets that arrive irregularly) between consecutive packets. A receiver system is also needed through which the perceived speech quality will be good—particularly improved over conventional receiving systems. A receiver system is also needed to smooth out delay variations—especially by handling jitter in such a way that the size of the jitter buffer can be adapted in an efficient manner. A receiver system is also needed which contains a jitter buffer adapted to balance the delay at the receiving side while still optimizing packet loss. A receiver system including a jitter buffer is also needed to fulfill any requirements and recommendations relating to regular telephony services, and for which the jitter buffer can adapt in an easy manner.

A jitter buffer, according to the present invention, is given a broad interpretation. It refers to a jitter buffer where packets are stored before fetching by a decoder. It may, however, also relate to storing or buffering channels, wherein speech is stored in its decoded form (i.e., after decoding in the decoder). This is applicable when decoding is substantially performed as soon as packets are received in the receiver. This is how the functional size of the jitter buffer is determined.

Moreover, a system is needed for adapting the functional size of a jitter buffer in a receiver system, within a communication system supporting packet-based communication of speech and data, through which jitter buffer adaptations can be performed in an efficient and easy manner. A system is also needed to smooth out delay variations in the reception of consecutive packets containing speech. Moreover, a system is needed to provide good speech quality while reducing the risk of lost packets. Still further, a system is needed for improved perceived speech quality at the receiver. A system is also needed through which the jitter buffer handling capability, within a receiver system, can be improved, facilitated and, particularly, optimized.

Therefore, a receiver system is provided which includes a receiver, speech decoder, and a jitter buffer, in which packets containing frames with encoded speech are received (i.e., the buffer receives packets from the network comprising speech parameters representing one or more speech frames comprising a number of samples). The present invention further provides a jitter buffer controller for keeping information about the size of the jitter buffer and for providing speech decoding with control information such that speech decoding, based on such information, includes information about the received (encoded or decoded) speech signal, and provides for a dynamic adaptation of the size of the jitter buffer by modification of the received, packetized speech signal. According to different embodiments, the speech signal may be modified during the decoding step, or after decoding.

In one embodiment, the jitter buffer controller uses information on the current size of the jitter buffer and on the desired (default) size of the jitter buffer to determine if, and how, the jitter buffer size needs to be adapted.

A packet particularly contains at least one speech frame, each frame containing a number of parameters representing speech. In a particular implementation, a received packet consists of one speech frame representing, for example, 160 samples when decoded. According to the invention, the speech signal is compressed or extended in time to adapt the functional size of the jitter buffer. The number of samples that remain in the receiver until the received packet has to be fetched by the decoder represents the current size of the jitter buffer. The desired, or default, size of the jitter buffer is represented by the number of samples that should remain in the receiver until the received packet has to be fetched by the decoder.

The present invention also adjusts the functional size of the jitter buffer, which is relevant when the speech decoder actually fetches packets (substantially as soon as they arrive), decodes them, and stores them before delivery to the D/A converter. This storing after decoding corresponds to the actual storing in the jitter buffer, hence the term functional size of the jitter buffer. Then, however, adaptation is somewhat delayed since adaptation of the size is done in relation to the subsequent packet.

Particularly, for controlling the size of the jitter buffer, a number of samples are added or removed upon decoding a packet in the decoder. In one embodiment, for adapting the size of the jitter buffer, a number of pitch periods (or a number of samples representing one or more pitch periods) are added or removed when decoding. Still further, the number of frames that a packet contains may be increased or decreased depending on whether the size of the jitter buffer needs to be increased or reduced.

The jitter buffer control detects the arrival times of packets at the jitter buffer and the time at which packets are fetched by the decoder for determining if, and how, the jitter buffer size needs to be adapted. A feedback channel is provided to inform the jitter buffer controller about the current jitter buffer size such that the controller always is provided with updated information about jitter buffer size. Via the feedback channel, information is provided to the controller about how many samples/frames/pitch periods were added/removed from packet at the latest adaptation of the jitter buffer size. Alternatively, if all the intelligence resides in the controller, there is no need to transfer the information, since it is already available to the controller. In one embodiment, for altering the number of samples or pitch periods, the currently received packet is used. Alternatively, for adding a frame to a packet, the parameters of a number of the preceding frames are used to synthesize a new frame. Alternatively, for insertion of a frame, parameters of a preceding frame and of a subsequent frame can be used in an interpolation step to provide a new frame. For deleting a frame, the subsequent frame is advantageously deleted from the jitter buffer.

In one embodiment, the decoder comprises a CELP or other similar decoder, and an already existing controller therein may be used as the jitter buffer controller. In an alternative embodiment, the decoder performs an LPC-analysis to provide an LPC-residual and conduct an LPC-synthesis.

In one embodiment, a method of adapting the (functional) size of a jitter buffer in a terminal unit in a communication system supporting packet-based communication of speech and data is provided which comprises the steps of: receiving a speech signal, with encoded speech in packets, from a transmitting side in a jitter buffer of a receiver; storing the packets in a jitter buffer; fetching packets from the jitter buffer to a speech decoder. The method may further comprise the steps of: detecting if the functional size of the jitter buffer needs to be increased or decreased and, if it does, extending or compressing the received speech signal in time through controlling the number of samples the speech frames stored in the jitter buffer would represent when decoded. This method may, in order to extend or compress the speech signal, increase or decrease the rate at which the decoder fetches packets from the actual jitter buffer or, alternatively, the rate at which the decoder outputs frames, in the case when decoding is done substantially as soon as a packet arrives to the jitter buffer.

In another embodiment, the method comprises adapting the size of the jitter buffer by adding or deleting one or more samples when a packet is decoded in the decoder. In an alternative embodiment the method includes adding or removing one or more pitch periods upon decoding in the decoder. In still another embodiment, the method includes adding or removing one or more frames to or from a packet. In this instance, an additional frame is then introduced between two packets. The additional frame will generate a speech frame comprising N samples, e.g. 160 samples.

The present invention may further comprise the step of detecting, in an automatic control, the arrival times of packets to the jitter buffer and the times at which packets are fetched by the decoder, to determine if and how the jitter buffer size needs to be adapted. Another embodiment, instead of detecting packets fetched by the decoder, determines when the decoder has to output a packet to D/A converter (e.g., from a play-out buffer associated with the decoder).

The present invention may further comprise dynamically adapting the size of the jitter buffer through increasing or decreasing the rate at which the decoder fetches packets from the jitter buffer. According to one embodiment, a CELP or CELP-like decoder is used for adaptation control, thus using existing LPC parameters, giving an LPC-residual. In another embodiment, an LPC-analysis is performed to provide an LPC-residual before adding or removing samples/frames/pitch periods or performing an LPC-synthesis.

In one embodiment, a system handling delay variations of a jitter buffer in a receiver system in a communication system supporting packet-based communication of speech and data is provided, wherein packets with frames (one or more) of encoded speech are received in the jitter buffer from a transmitting terminal unit at a varying first frequency, and wherein the speech decoder fetches packets from the jitter buffer with a second frequency. The system comprises a jitter buffer controller to dynamically control the second frequency with which the decoder fetches packets from the jitter buffer, such that the size of the jitter buffer can be changed or adapted. The frequency at which fetching of packets is performed is controlled through increasing or decreasing the number of samples/pitch periods/frames contained in a packet, when decoded in the decoder.

In summary, the present invention provides a number of advantages over conventional systems and methods. With the present invention, receiver systems in a communication system provide for efficiently handling variations in arrival time (i.e. packets that arrive irregularly) between consecutive packets while providing improved perceived speech quality; and provide smoothed out delay variations at the receiver while efficiently adapting the size of the jitter buffer—balancing delays at the receiving side and optimizing packet loss. Other advantages offered by the present invention will be readily appreciated upon reading the below detailed description of the embodiments of the invention.

BRIEF DESCRIPTION OF THE DRAWINGS

The above and further advantages of the invention may be better understood by referring to the following description in conjunction with the accompanying drawings, in which:

FIG. 6 is a block diagram illustrating parts of a receiver system for adaptation of the jitter buffer according to the invention;

FIG. 7A is an illustration an original sequence of two speech frames;

FIG. 7B is an illustration of the insertion of a frame to the sequence of FIG. 7A;

DETAILED DESCRIPTION OF THE INVENTION

Figure 1:
FIG. 1 is a speech signal in the time domain.

The present invention provides a receiver system in a communication system supporting packet-based communication of speech and data (e.g., an IP-network). The receiver system includes a receiver, a speech decoder and a jitter buffer for handling delay variations in the reception of a speech signal consisting of packets containing frames with encoded speech. The present invention also provides a system for improving the handling of delay variations in a jitter buffer within the receiver system in a communication system supporting packet-based communication of speech and data. The present invention also provides a system for adapting the size of a jitter buffer in a receiver system a communication system supporting packet-based communication of speech and data.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates to packet-based communication systems supporting packet-based communication of speech and data. Specifically, illustrative embodiments are described as adapted for use in packet-based communication systems supporting packed-based communications of speech and data, where a transmitting communication unit samples input speech, comprising a number of speech parameters, which are then packetized in packets and transmitted over the network to a receiving unit. The receiving unit, or system, plays the recreated, decoded, speech signal with a sampling rate; and, at the receiving side, an adaptable jitter buffer handles the delay variations when the packets are unpacked. However, it shall be understood that the invention is not restricted to these exemplifying embodiments, or to such an application. The basic principles of the invention may likewise be applied to other communication systems.

In a packet-based communication system supporting packet based communication of speech and data, a first terminal unit, when acting as a transmitting communication unit, samples input speech comprising a number of speech parameters, (e.g. three types of parameters)—which here represent a speech frame comprising a number of samples (e.g., 160 samples for a 20 ms speech frame if a sampling rate of 8 kHz is used). Those parameters are packetized in packets and transmitted over the network to a receiver system which plays up the recreated, decoded, speech signal (e.g., with a sampling rate of 8 kHz). At the receiving side, the packets are thus unpacked. However, as referred to earlier, delays with which packets are received on the receiving side may be different from one packet to another since some of the packets are transmitted quickly over network whereas others are transmitted slowly. Moreover, the clocks of the transmitting and receiving sides, respectively, are usually not synchronized. If a subsequent packet has not arrived when the preceding packet already has been played out, the user of the receiver will perceive this as a disturbance. The jitter buffer handles such delay variations because it is important that there is something to play up at all times.

Referring now to the drawings, FIG. 1 illustrates a typical segment of a speech signal in the time domain. This speech signal shows a short-term correlation corresponding to the vocal track and a long-term correlation corresponding to the vocal cords. The short-term correlation can be predicted by using an LPC-filter and the long-term correlation can be predicted through the use of an LTP-filter. LPC is linear prediction coding. Similarly, LTP is long-term prediction coding. Linear, in this case, implies that the prediction is a linear combination of previous samples of the speech signal.

The LPC-filter is usually denoted:

$$H(z)\frac{1}{A(z)} = \frac{1}{1 - \sum_{i=1}^{n} a_i z^{-i}}$$

Through feeding a speech signal through the LPC-filter, H(z) the LPC residual, $r_{LPC}(n)$, is found.

Figure 2:
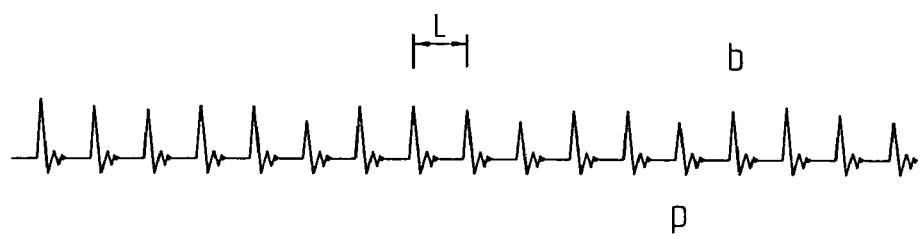
FIG. 2 is an LPC-residual of a speech signal in the time domain.

The LPC residual shown in FIG. 2 contains pitch pulses P generated by the vocal cords. The distance between two pitch pulses is a so-called lag. The pitch pulses P are also predictable, and since they represent the long-term correlation of the speech signal, they are predicted through a long-term predictor, i.e. an LTP-filter given by the distance L between the pitch pulses P and the gain b of a pitch pulse P. The LTP filter is commonly denoted:

$$F(z) = b \cdot z^{-L}$$

When the LPC-residual is fed through the inverse of the LTP-filter F(z), an LTP-residual $r_{LTP}(n)$ is created. In the LTP-residual the long-term correlation in the LPC-residual is removed, giving the LTP-residual a noise-like appearance.

Figure 3:
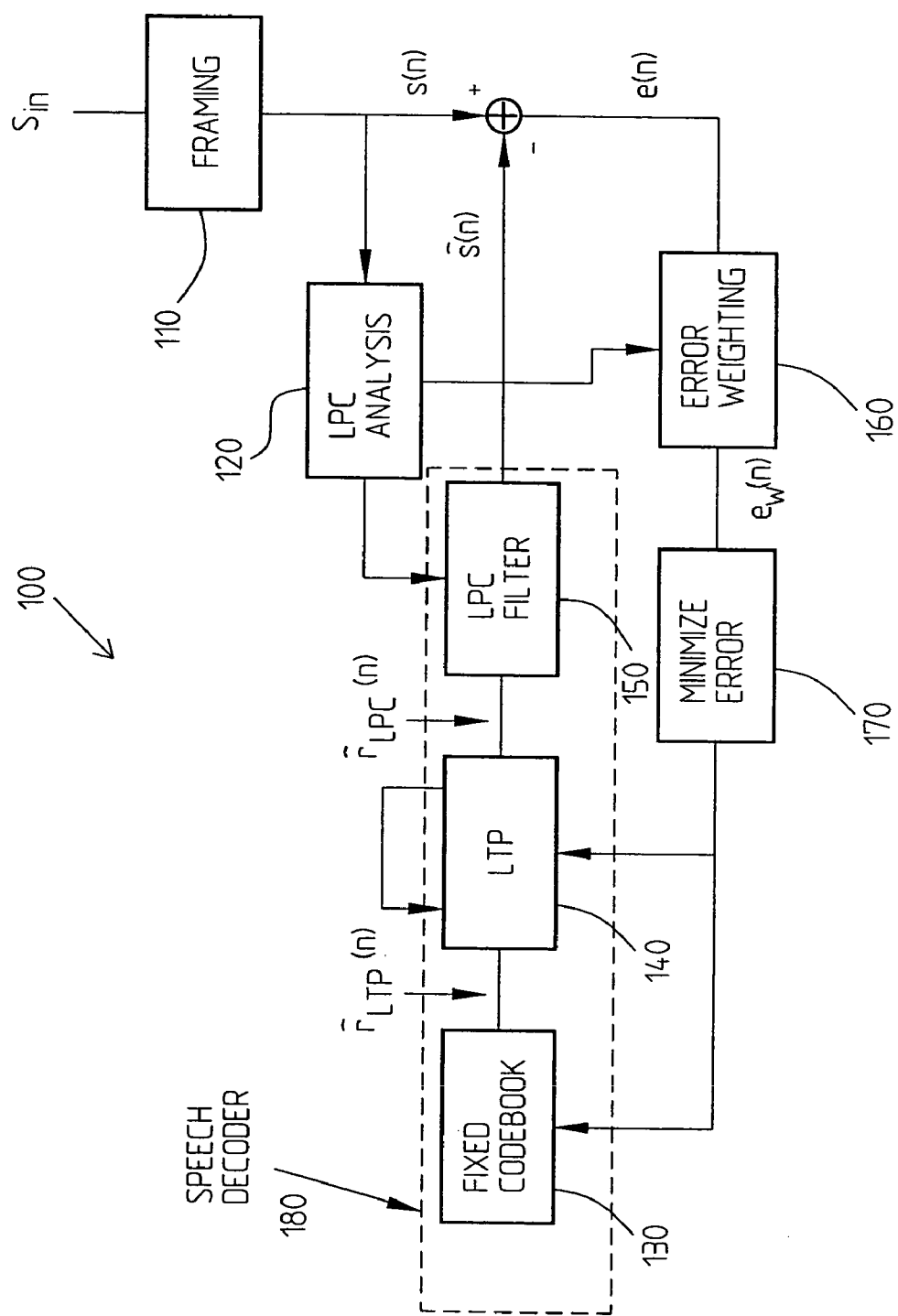
FIG. 3 is an analysis-by-synthesis speech encoder with an LTP-filter.

Many low bit rate speech coders are so-called hybrid coders. In FIG. 3 an analysis-by-synthesis speech encoder 100 with LTP-filter 140 is illustrated. The vocal track is described with an LPC-filter 150 and the vocal cords is described with an LTP-filter 140, while the LTP-residual $\hat{r}_{LTP}(n)$ is waveform-compared with a set of more or less stochastic codebook vectors from the fixed codebook 130. The input signal $I_{IN}$ is divided into frames 110 with a typical length of 10-30 ms. For each frame, an LPC-filter (a short-term predictor) 150 is calculated through an LPC-analysis 120 and the LPC-filter 150 is included in a closed loop to find the parameters of the LTP-filter 140, i.e. the lag portion and LTP gain, the fixed codebook, codebook index and codebook gain. The speech decoder 180 is included in the encoder and consists of the fixed codebook 130 which output $\hat{r}_{LTP}(n)$ is connected to the LTP-filter 140 the output $\hat{r}_{LTP}(n)$ of which is connected to the LTP-filter 140, the output of which $\hat{r}_{LPC}(n)$ is connected to the LPC-filter 150 generating an estimate ŝ (n) of the original speech signal $S_{IN}(n)$. In the analysis to find the best set of parameters to represent the original sequence, the parameters of the fixed codebook, the gain and the long-term predictor are thus combined in different ways to generate different synthesized signals. Each estimated signal ŝ (n) is compared with the original speech signal $S_{IN}(n)$ and a difference signal e(n) is calculated. The difference signal e(n) is then weighted in 160 for calculation of a perceptual weighted error measure $e_w(n)$. The set of parameters giving the least perceptual weighted error measure $e_w(n)$ is transmitted to the receiving side 170. This method, analysis by synthesis, thus consists in comparing different synthesized signals and selecting the best match.

Figure 4:
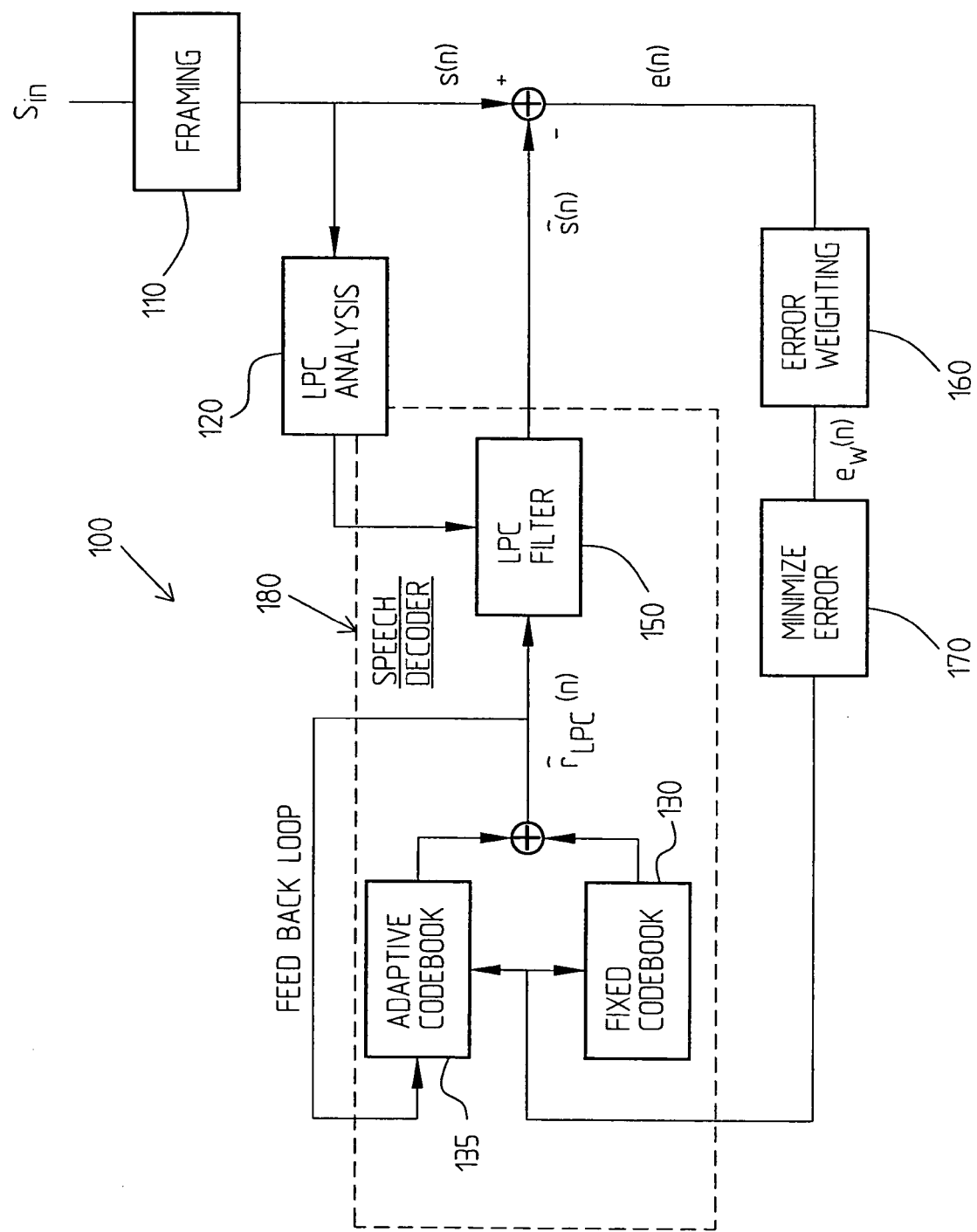
FIG. 4 is an analysis-by-synthesis speech encoder with an adaptive codebook.

FIG. 4 illustrates another type of analysis-by-synthesis speech encoder 100 in which the LTP filter of FIG. 3 (140) is exchanged through an adaptive codebook 135. The LPC-residual $\hat{r}_{LPC}(n)$ is the output from the sum of the adaptive and the fixed codebooks 135 and 130. All other elements have the same functionality as in FIG. 3 illustrating the analysis-by-synthesis speech encoder with LTP-filter 140.

The above brief summary of the functioning of speech coding with reference to FIGS. 3 and 4, is included merely for the purposes of giving an understanding of the methods that will be described in relation to the present invention. In practice, much work is spent on reducing the complexity and on increasing the perceived speech quality—some of which is beyond the scope of the present invention. Any suitable type of speech coding may be implemented in accordance with the present invention.

Figure 5:
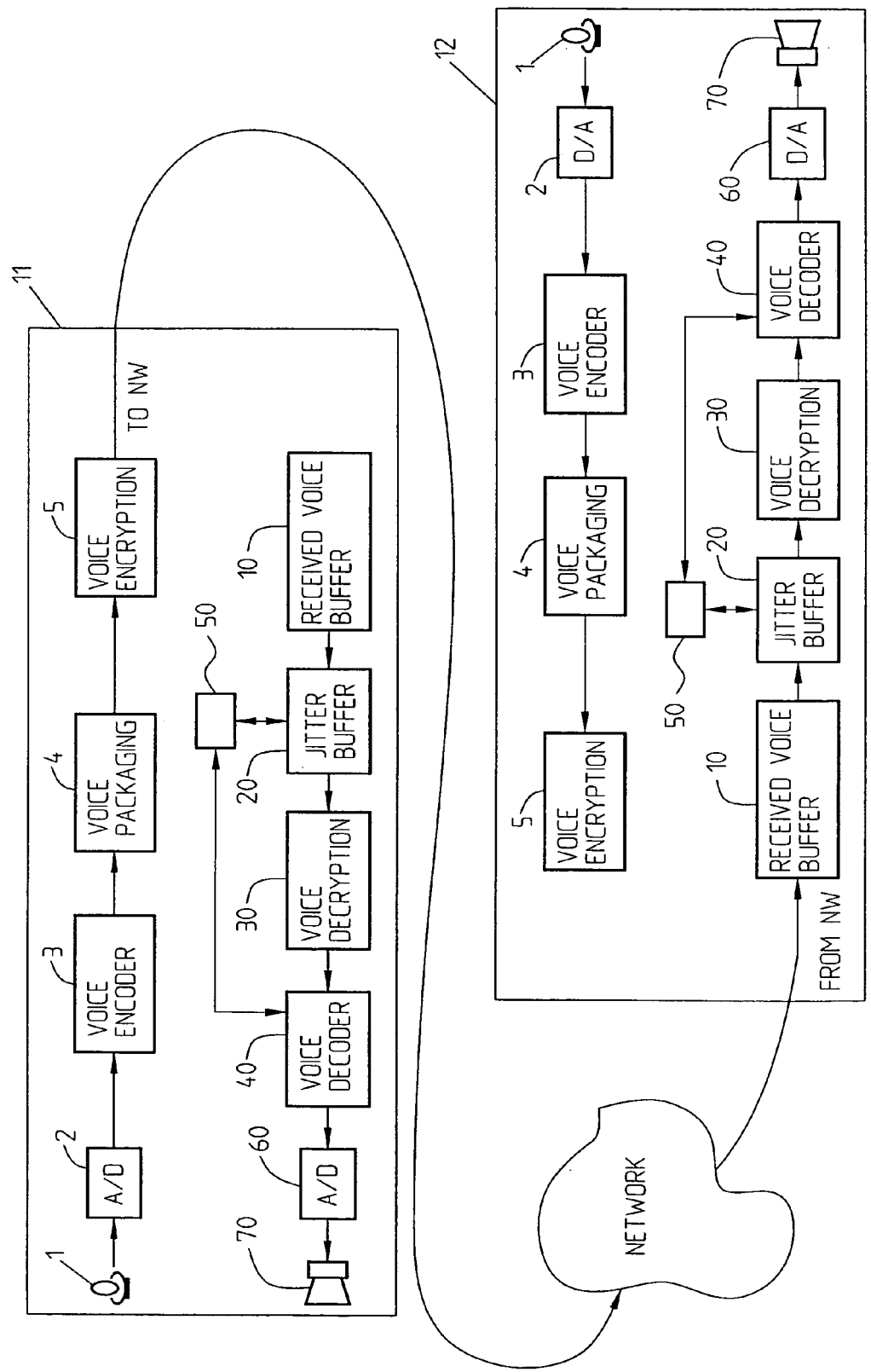
FIG. 5 is a block diagram of two telecommunication units, one of which acts as a transmitter transmitting a signal over the network to the other acting as a receiver.

FIG. 5 schematically illustrates block diagrams of two telephone units, e.g. IP-phones, each of which of course is able to act both as a transmitter and a receiver, but in this figure one of the telephone terminal units 11 is supposed to act as a transmitter transmitting a signal to another telephone terminal unit 12 acting as a receiver system. The terminal units 11, 12 include a microphone 1, A/D converter 2, voice encoder 3, voice packager 4 and voice decryptor 5, for transmitting a signal over the network to another terminal unit 12, or transceiver. The voice decryptors are not mandatory.

The receiver comprises a voice buffer 10 for receiving signals from the network, a jitter buffer 20 for handling the delay variations in the reception of packets over the network, voice decryptor 30 and voice decoder 40, a D/A converter 60 and loudspeaker 70. The voice buffer and the jitter buffer may also consist of one common unit, simply denoted jitter buffer. Jitter buffer controller 50 communicates with the jitter buffer 80, and voice decoder 40 is used to control adaptation of the size of jitter buffer 20, as further explained with reference to FIG. 6.

According to one embodiment of the present invention, the decoder at the receiving side comprises a CELP-decoder or a CELP-like decoder. In that case, the adaptation control can be performed using the decoder. According to other embodiments, where other decoders are used, the characteristics of the input speech signal are used for the adaptation. In both cases, the present invention processes the input speech signal to either expand or compress it in time, in order to provide for the appropriate adaptation of the jitter buffer (i.e. the size of the jitter buffer).

FIG. 6 is a block diagram which simplified to only illustrate those parts of the receiver system that actually are involved in adaptation of the jitter buffer according to the present invention. Thus, input to the jitter buffer consists of packets from a network (e.g., from a terminal unit acting as transmitter), and the packets from the network comprise speech parameters, representing one or more speech frames each comprising a number, N, of samples (e.g., 160 samples if a sampling frequency 8 kHz is used). Thus, packets are stored in jitter buffer 20 and the jitter buffer must have a certain size in order to enable a continuous flow to speech decoder 40. Other sampling frequencies can be used.

If, for example, the size of the buffer is too small then there is nothing to play out—which may be the case if the delay in the network is too long. According to the present invention, the jitter buffer size is then increased. If the speech decoder wants to play out with a frequency of 8 kHz, it fetches packets (e.g., normally comprising 160 samples) from the jitter buffer, synthesizes speech, and plays it out. If, for example, the size of the jitter buffer is fixed and corresponds to 160 samples, it is not possible to change the size of the jitter buffer and a packet will be fetched every 20 ms. If, however, according to the present invention, it is detected that the jitter buffer size needs to be increased, then, for example, the speech decoder does not fetch the packet after 20 ms but instead after 22 ms (i.e., it waits two more milliseconds until it fetches the next packet). According to one embodiment, samples are then added in the decoder, which means that the speech signal is extended through two ms. For example, one or more pitch period may be added or, for example, 16 samples during a given period. Thus, a packet is fetched which contains a number of speech parameters. Normally the parameters would be converted to a number of samples—typically 160 samples. If adaptation of the size of the jitter buffer is needed, the number of samples that the parameters represent can be changed and then samples, pitch periods or frames can be added or removed in the decoder, or frames can be added or removed in the jitter buffer. In other words, the time period, until the subsequent packet is fetched, is prolonged or shortened. If the time period is prolonged, the size of the jitter buffer is increased, and vice versa, if the time period is shortened, the size of the jitter buffer is reduced.

Returning to FIG. 6, the jitter buffer controller 50 keeps information about the current size of the jitter buffer corresponding to the number of samples the parameters in the jitter buffer would represent after decoding, and of the default jitter buffer size corresponding to the default or desired size of the jitter buffer 20 corresponding to the number of samples the parameters should represent after decoding.

In one embodiment, jitter buffer controller 50 detects the times at which packets arrive and the time when packets are fetched by the speech decoder 40. At the input side, the frequency varies due to the delay variations. A solution is then to fetch packets more or less often to dynamically adapt the rate at which packets are fetched. Thus, using the information on arrival times of packets to the jitter buffer, and the times when packets are fetched by the decoding, the jitter buffer controller 50 determines if, and how, the jitter buffer 20 size needs to be adapted.

Thus, in one embodiment, information about the speech signal is provided from the speech decoder 40 to the jitter buffer controller 50 containing, for example, an analysis of the speech signal content, which information comprises input data to be used in the decision as to when, if, and how the adaptation is to be performed. The adaptation, or modification, may be done during the decoding step, or after decoding. Information relating to the speech signal, on which the modification decision is based, may relate, in different embodiments, to the encoded or to the decoded speech signal. This procedure will be further described below. Control information relating to the decision that has been made, is forwarded to speech decoder 40, in this implementation. Thus, whenever the speech decoder needs a speech analysis frame to process for speech synthesis generation, speech decoder 40 extracts the frame from the jitter buffer 20 together with data information. The data information may, for example, be estimated bit rate within the frame, etc.

As referred to above, in parallel, the speech decoder 40 also gets the control information from the jitter buffer controller 50 as to whether or not it should modify the current frame. If the control information says that a modification is needed, information is also contained relating to how the frame should be modified (i.e., expanded or compressed), and the kind of modification (e.g., if a single sample is to be added or removed, if one or more pitch periods are to be added or removed, or if a frame is to be added or removed).

In one embodiment, a modification is performed within the current frame or packet in the most appropriate way. According to another embodiment, the intelligence lies in the jitter buffer controller. Alternatively, the functionality of the jitter buffer controller may be provided in the speech decoder. Still further, the control functionality and the intelligence may be distributed between the speech decoder and the jitter buffer controller. Then, for example, information about the result of an intended modification is provided from the speech decoder to the jitter buffer controller.

A modification may be done in different ways—for example, through extracting or compressing the speech signal, depending on whether the size of the jitter buffer needs to be increased or decreased, and the speech signal can be extracted or compressed in different ways. One way is to insert or delete one or more samples. It is also possible to insert or delete one or more pitch periods—which actually is also an insertion or deletion of a number of samples. Still further it is possible to insert or delete one or more frames (i.e., that also being an insertion/deletion of a number of samples, which is the most general definition). There may also be other ways a speech signal can be extracted or compressed in accordance with the present invention, as well.

As soon as the speech signal is extracted or compressed in time, jitter buffer size is affected indirectly, since the play back point of the next speech frame is adjusted. Methods for inserting or deleting samples are given in "Method and Apparatus in a Telecommunication System", which is incorporated herein by reference. However, the methods disclosed therein were evaluated for compensation of clock drift in the sampling frequency between the sending and the receiving side to avoid starvation in the play out buffer or to avoid an increasing delay. Starvation will occur if the receiving side has a higher sampling rate than the sending side and the delay will increase if the receiving side has a lower sampling rate than the sending side. According to the present invention, such methods can be used for jitter buffer adaptation. Hence, jitter buffer size can be adapted in different ways using sample, pitch or frame insertion/deletion.

If the modification is a frame insertion (e.g., as decided by controller 50), such modification can be provided for in different ways. In one embodiment, the parameters of a previous frame are repeated and used during the synthesis of the inserted frame. Alternatively, corresponding to an advantageous implementation, a set of parameters is used during the synthesis of the inserted frame that has been derived from interpolation of parameters from the previous frame and the next frame, respectively. Such an approach is similar to that used for concealing lost frames (Error Concealment Units).

FIGS. 7A, 7B illustrate insertion of a frame. In FIG. 7A, a portion of an original frame sequence is illustrated in which a previous frame is indicated as well as a next frame. FIG. 7B illustrates how the inserted frame is introduced between the previous frame and the next frame.

If a frame is to be deleted, then the next subsequent frame may be deleted from the jitter buffer and a smoothing action is performed in the next frame. From the speech decoder 40, speech information and synthesized speech is output. The speech information comprises a number of samples that have been generated, information of about how many samples are comprised in a pitch period as well as other characteristics of the speech (e.g., if the speech is voiced or unvoiced). The jitter buffer controller 50 uses the speech information for taking the decision about which, if any, modification that needs to be done. Typically, pitch period will be between substantially 20 and 140 samples if a sampling information frequency of 8 kHz is used. Since the pitch period is quasi-stationary, at least during voiced segments of the speech, jitter buffer controller 50 obtains a rough estimate of pitch period through considering the pitch periods of previous frames. Based on this information, the jitter buffer controller 50 is able to decide if a pitch based action or if a frame based action is the most appropriate. The speech decoder 40 gives the result of the modification after the modification action has been done. The size of the speech synthesis frame will vary, depending on which action is taken. For a single sample insertion/deletion the value will be (framesize+1) and (framesize−1), respectively. For a frame insertion/deletion, the value will be (2×framesize) and (0), respectively. For the action pitch insertion/deletion, the size of the speech synthesis frame will vary depending on which pitch period that actually has been inserted or removed.

The jitter buffer controller 50 uses two values to make a decision relating to adaptation as briefly mentioned in the foregoing. The first value is a current size of the jitter buffer, which is represented by the number of samples that remains in the receiver system until the received packet has to be fetched by the decoder. The second value is the default size, which is represented by the number of samples that should remain in the receiver system until the received packet has to be fetched by the decoder. If the current size differs greatly from the default size to allow adaptation within one and the same speech frame, subsequent frames will be used to adapt the size of the jitter buffer 50.

In embodiments in which the receiving system contains a non CELP-type decoder, the methods of the present invention can be implemented by introducing some additional steps—such as performing an LPC analysis to achieve a LPC residual. The same actions as described above, inserting or deleting one or more samples, frames or pitch periods, are then performed followed by an LPC synthesis. In the patent application "Method and Apparatus in a Telecommunication System" referred to above, such sample rate conversion methods are described.

The present invention may be implemented even when no CELP-like decoder is available, utilizing the general methods of the present invention. In one embodiment, a single sample is inserted or deleted on a raw speech signal. In this case, a framing of the speech signal is made. Samples to remove are selected in a manner so as to avoid segments with more information, i.e., where the signal varies rapidly. However, cautiousness should be used when implementing this method because, if insertion/deletion is made too often, the speech quality will run the risk of being deteriorated.

Figure 8A:
FIG. 8A is an illustration of an original waveform sequence.
Figure 8B:
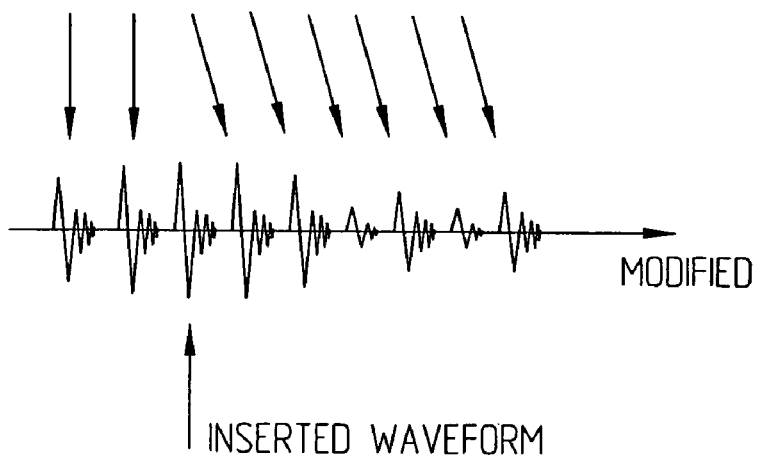
FIG. 8B is an illustration of the insertion of a pitch based waveform segment to the sequence of FIG. 8A.

If there is a need for a faster adaptation on a raw speech signal, a segment of the waveform can be repeated as illustrated in FIGS. 8A and 8B, wherein FIG. 8A illustrates an original waveform sequence and FIG. 8B illustrates how a pitch based waveform is inserted.

Figure 9A:
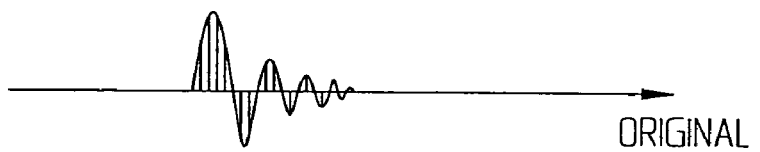
FIG. 9A is an original waveform.
Figure 9B:
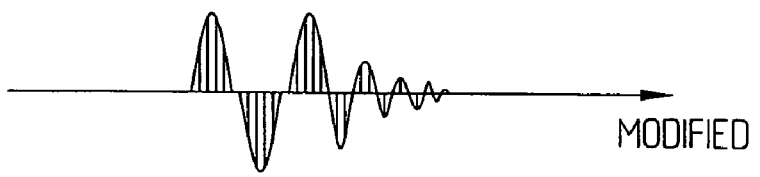
FIG. 9B is an illustration of the insertion of a waveform segment to the waveform of FIG. 9A.

The repetition may be a full pitch period, but it can also be limited to a single wave as illustrated schematically in FIG. 9B. FIG. 9A illustrates the original waveform whereas FIG. 9B illustrates the modified waveform wherein a waveform segment has been inserted. Thus, according to the invention, the concept can be implemented when CELP or CELP-like decoders are available, when other decoders are available using a pseudo-CELP approach as described above, or, insertions/deletions can be done to/from the speech signal itself.

Figure 10:
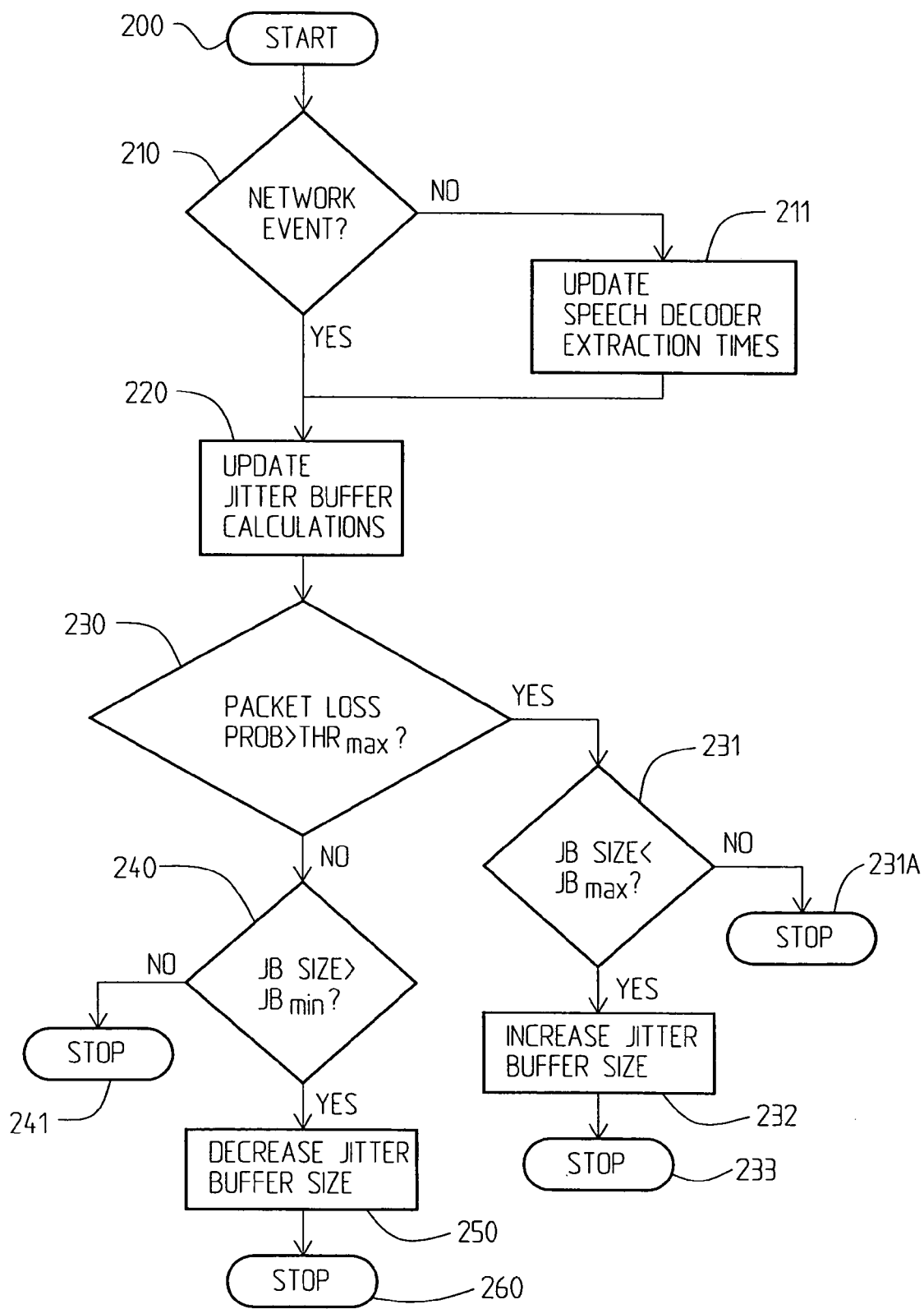
FIG. 10 is a flow diagram describing the functioning of a jitter buffer controller.

FIG. 10 is a flow diagram describing processing flow of the jitter buffer controller 50. It functions as follows: from the start, 200, it determines if there has been a network event, 210. In other words it determines whether a packet has arrived. If not, the speech decoder is updated as far as the extraction times are concerned, 211 (i.e., no packet has arrived). If, however, a packet has arrived, the jitter buffer calculations are updated, 220.

The size of the jitter buffer can be calculated in different ways. One way to calculate the size of the jitter buffer is to have a sliding average, where for every packet the time left until an incoming packet is to be used for speech synthesis s measured. For consecutive packets, this will of course vary, but through taking a number of values, for example, the ten last values, and then form the average, it is possible to see if the jitter buffer tends to be too large or too small or if it appears to have the appropriate size. It is then established if the packet loss probability exceeds a maximum threshold value $THR_{max}$, 230. Also this value depends on the situation. $THR_{max}$ is the probability threshold that should be observed i.e. it should not be exceeded, in order to provide a sufficient speech quality but it varies depending on which speech decoder that actually is used.

The jitter buffer minimum size $JB_{min}$ is the smallest size the jitter buffer should have depending on the variance in the delay variation of incoming packets. The jitter buffer also has a maximum value $JB_{max}$ that should not be exceeded; otherwise the speech quality would be negatively affected. Delay variation is the calculated variation of the interval between two consecutive packets. If the jitter buffer size is smaller than the maximum jitter buffer size $JB_{max}$, 231, the jitter buffer size should be increased, 232, and then the procedure is stopped, 233, until being repeated again from 200 above. If however the jitter buffer size is not smaller than the maximum, nothing is done, 231A, until the procedure is repeated again from 200 above. If however it was established that the probability of loosing packets was smaller than the maximum threshold value $THR_{max}$ (230), is examined if the jitter buffer size exceeds the minimum jitter buffer size $JB_{min}$, 240. If yes, the jitter buffer size is decreased, 250, and then nothing is done, 260, until the procedure is repeated again from 200 above. If it was established that the jitter buffer size did not exceed the minimum size, nothing is done, 241, until the procedure is repeated from 200 above.

It should be clear that the invention is not limited to the explicitly described embodiments, but that it can be varied in a number of ways within the scope of the appended claims. It is, for example, applicable to a number of decoders, not just so called CELP-decoders or CELP-like decoders. Moreover packet storing can be effected in the physical jitter buffer or after decoding in the decoder, hence the reference to functional size of the jitter buffer, or functional jitter buffer.

Although preferred embodiments of the present invention have been described in detail, it will be understood by those skilled in the art that various modifications can be made therein without departing from the spirit and scope of the invention as set forth in the amended claims.

What is claimed is:

1. A receiver system in a communication system supporting packet-based communication, comprising:
    a receiver adapted to receive packet signals;
    a speech decoder adapted to decode the signals from the receiver;
    a jitter buffer adapted to handle delay variations in the reception of the signals; and
    a jitter buffer controller providing information on a functional size of the jitter buffer;
    wherein the speech decoder, responsive to the information from the jitter buffer controller, provides a dynamic adaptation of a size of the jitter buffer by modifying the packet signal.

2. The system of claim 1, wherein a packet contains at least one frame.

3. The system of claim 1, wherein the decoder comprises a CELP-type decoder having a controller adapted to function as the jitter buffer controller.

4. The system of claim 1, wherein the decoder comprises an LPC-synthesizer.

5. The system of claim 1, wherein the jitter buffer size is adaptable through the jitter buffer controller responsive to information in the current and desired sizes of the jitter buffer.

6. The system of claim 5, wherein the jitter buffer controller is adapted to detect the time that packets arrive into the jitter buffer, and the time at which packets are fetched by or output from the decoder, to determine the size of the jitter buffer.

7. The system of claim 6, wherein the jitter buffer controller is provided with a feedback channel to update the jitter buffer control concerning the current jitter buffer size.

8. The system of claim 7, wherein the feedback channel provides information concerning the number of samples, frames and pitch periods added or removed during a most recent adaptation of the jitter buffer size.

9. The system of claim 1, wherein the jitter buffer is adapted through time compression or extension of the received signal.

10. The system of claim 1, wherein the jitter buffer is adapted through increasing or decreasing the frequency with which the decoder fetches packets from the jitter buffer.

11. The system of claim 1, wherein the jitter buffer is adapted through adding or removing a number of samples when a packet is decoded.

12. The system of claim 11, wherein the number of frames in a packet are increased or decreased.

13. The system of claim 11, wherein a currently received packet is used for changing the number of samples or pitch periods.

14. The system of claim 11, wherein during the addition of a frame through insertion of a new frame, the parameters of a preceding frame and of a subsequent frame are used in an interpolation step to structure a new frame.

15. The system of claim 11, wherein the jitter buffer is adapted by adding or removing pitch periods when a packet is decoded.

16. The system of claim 15, wherein frames are added to the packet, according to the parameters of a number of preceding frames, to synthesize a new frame.

17. The system of claim 15, wherein frames are deleted from the packet and a subsequent frame is deleted from the jitter buffer.

18. The system of claim 2, wherein the received packet contains one speech frame which, when decoded in the decoder, represents a number of samples.

19. The system of claim 2, wherein current size of the jitter buffer is represented by the number of samples that remain in the receiving system until a received packet has to be fetched by the decoder, and wherein the desired size of the jitter buffer is represented by the number of samples that should remain in the receiver system until the received packet has to be fetched by the decoder.

20. A system for improving the handling of delay variations of a jitter buffer in a receiver system in a communication system supporting packet-based communication, comprising:

a jitter buffer receiving a signal comprising packets with frames of encoded signals from a transmitting terminal unit at a varying first frequency;

a speech decoder fetching packets from the jitter buffer with a second frequency; and a litter buffer controller for dynamically controlling the second frequency with which the speech decoder fetches packets from the jitter buffer such that a size of the jitter buffer is adapted or changed.

21. The system of claim 20, wherein the second frequency is controlled by a procedure chosen from the group consisting of:

adding or removing samples to or from the signal;

adding or removing pitch periods to or from the signal; and adding or removing frames to or from the signal.

* * * * *